(12) United States Patent  (10) Patent No.: US 8,437,027 B2
Moore et al.  (45) Date of Patent: May 7, 2013

(54) SYSTEM AND METHOD FOR TRACKING THE BYPASS OF A PRINT GOVERNANCE POLICY

(75) Inventors: John A. Moore, Victor, NY (US); Harpreet S. Kohli, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 398 days.

(21) Appl. No.: 12/904,304

(22) Filed: Oct. 14, 2010

(65) Prior Publication Data

US 2012/0092699 A1  Apr. 19, 2012

(51) Int. Cl.
*G06F 15/00* (2006.01)
*G06K 1/00* (2006.01)

(52) U.S. Cl.
USPC .......................... 358/1.15; 358/1.9; 358/1.13

(58) Field of Classification Search .................. None
See application file for complete search history.

(56) References Cited

U.S. PATENT DOCUMENTS

| | | | |
|---|---|---|---|
| 7,072,593 B2 | 7/2006 | Negishi | 399/8 |
| 2006/0031351 A1 | 2/2006 | Marston et al. | 709/206 |
| 2006/0123411 A1 | 6/2006 | Hanson et al. | 717/174 |
| 2009/0257082 A1 | 10/2009 | Kohli et al. | 358/1.15 |
| 2009/0310160 A1 | 12/2009 | Kai et al. | 358/1.9 |

OTHER PUBLICATIONS

U.S. Appl. No. 12/428,862, filed Apr. 23, 2009.
U.S. Appl. No. 12/540,941, filed Aug. 13, 2009.
U.S. Appl. No. 12/626,750, filed Nov. 27, 2009.

*Primary Examiner* — Thierry Pham
(74) *Attorney, Agent, or Firm* — Kermit D. Lopez; Luis M. Ortiz; Ortiz & Lopez, PLLC

(57) ABSTRACT

A device management system and method for tracking bypass of a print governance policy. A print control agent application can be configured with a set of predefined print governance policies in order to manage a rendering job activity. The print control agent application can pass, confirm and/or reject the rendering job based on the print governance policies. The rendering job activity that bypasses the print governance policies based on a policy violation approach can be tracked and measured utilizing a set of tracking algorithms in order to generate a tracked data. A bypass report can be visually generated based on the tracked data in order to analyze the policy violation and its frequency of occurrence thereby improving compliance with the rendering policies.

20 Claims, 5 Drawing Sheets

SYSTEM AND METHOD FOR TRACKING THE BYPASS OF A PRINT GOVERNANCE POLICY

TECHNICAL FIELD

Embodiments are generally related to rendering devices such as, for example, printers, scanners, photocopy machines, multi-function devices and the like. Embodiments are also related to rendering device management systems and methods.

BACKGROUND OF THE INVENTION

Networked rendering devices can interact with an assemblage of other rendering devices, client devices, servers, and other components that are connected to and communicate over a network. One example of a rendering device is a MFD (Multi-Function Device), which includes the functionality of multiple rendering devices such as printers, scanners, faxes, copy machines, and so forth. Such networked rendering devices can be communicatively linked with a client device in order to provide various operations such as, for example, printing, scanning, and other operations within the network.

With the proliferation of color rendering devices, a managed rendering service provider deploys an output management solution for governing the use of rendering documents with respect to a customer. Such output management solutions must be managed correctly when deployed as part of a managed services agreement in order to ensure cost effective print governance. A print governance application typically monitors a print request and enforces a business rule in order to maximize the rendering efficiency by reducing consumables such as, for example, toner and paper and redirects the rendering job to more cost effective rendering device. Majority of prior art output management solutions generally utilize a set of rules to control rendering operations and meet the cost savings promised in the services agreement. Such prior art approaches however lack the ability to track and measure the print activity that bypasses the print governance policy and/or rule with respect to the print governance application.

Based on the foregoing, it is believed that a need exists for an improved system and method for tracking bypass of a print governance policy within a network, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method and system for configuring a networked rendering device such as, for example, a printer, scanner, photocopy machine, fax machine, and/or an MFD.

It is another aspect of the disclosed embodiments to provide for an improved rendering device management system and method.

It is a further aspect of the disclosed embodiments to provide for an improved system and method for tracking bypass of a print governance policy within a network.

The aforementioned aspects and other objectives and advantages can now be achieved as described herein. A device management system and method for tracking bypass of a print governance policy is disclosed herein. A print control agent application can be configured with a set of predefined print governance policies in order to manage a rendering job activity. The print control agent application can pass, confirm and/or reject the rendering job based on the print governance policies. The rendering job activity that bypasses the print governance policies based on a policy violation approach can be tracked and measured utilizing a set of tracking algorithms in order to generate a tracked data. A bypass report can be visually generated based on the tracked data in order to analyze the policy violation and its frequency of occurrence thereby improving compliance with the rendering policies.

An average bypass rate can be calculated based on a difference between the total impressions rendered during a predefined period and a job accounting data record in order to track the rendering job activity that bypasses the print governance policies utilizing a non-standard rendering protocol. The total impression rendered during the predefined period can be calculated by a device meter and the job accounting data record can be reported by a print control agent software application. The rendering job rendered with the print control agent in a shutdown mode can be tracked by retrieving and reporting a missing rendering job record from a system event log and/or a performance counter to the device management system. Similarly, the rendering job activity that bypasses the print governance policies by splitting a large rendering job into multiple rendering jobs can be tracked by analyzing and linking the rendering job with similar document title and a user name.

A time and date captured by a local machine and a remote reliable source can be compared to track the rendering activity that bypasses the print governance policies by providing an incorrect day and time. The rendering activity that bypasses the print governance policies by converting a document type to a different format can be tracked by interrogating a print stream in order to determine an original file type of the rendering job. The bypass report with respect to the policy violation approaches can be employed to estimate cost saving rendering solutions. Such an approach provides an effective tool for improving overall effectiveness and compliance with respect to the print governance policies.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
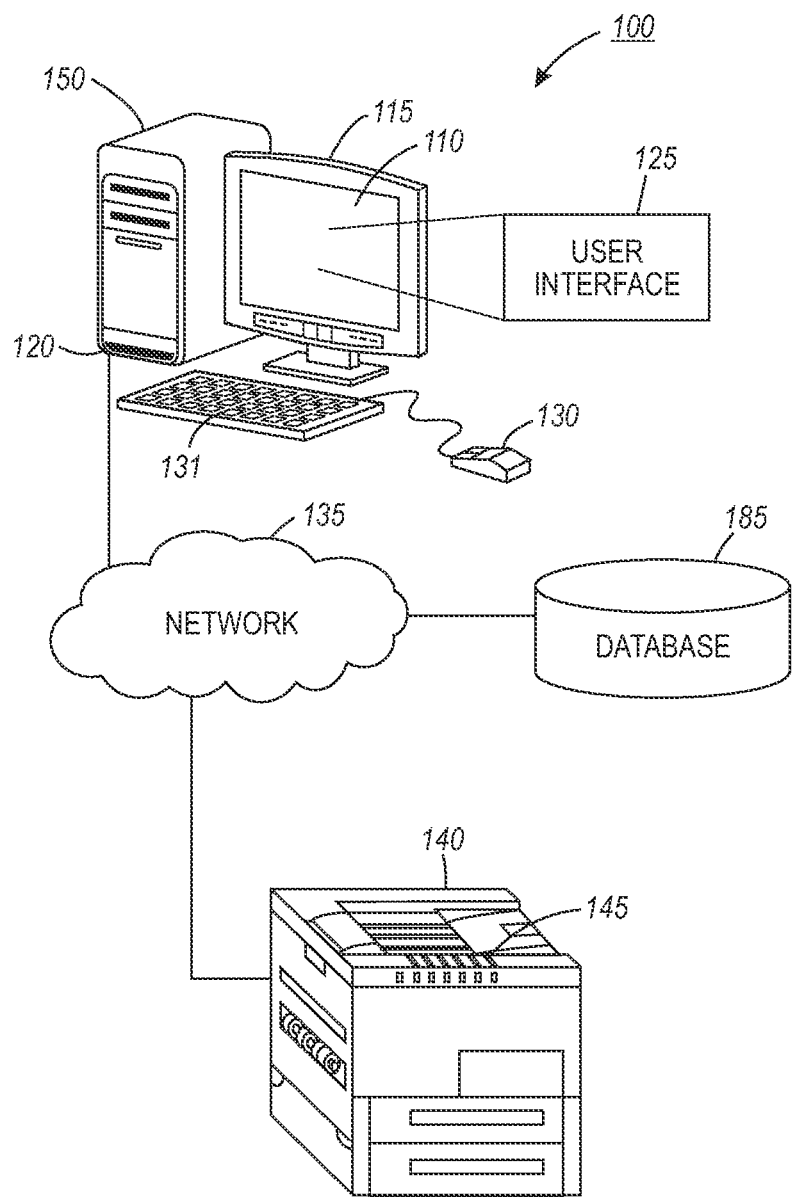
FIG. 1 illustrates an example of a rendering device coupled to a data-processing apparatus through a network, in accordance with the disclosed embodiments.

FIG. 1 is provided as an exemplary diagram of data processing environments in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

Referring to FIG. 1, system 100 includes a rendering device 140 coupled to a data-processing apparatus 110 through a network 135. In some embodiments, rendering device 140 may be a rendering device such as a printer, scanner, copy machine, etc. In other embodiments, rendering device 140 may be an MFD. The data-processing apparatus 110 may be, for example, a personal computer or other computing device, and generally includes a central processor 120, a display device 115, a keyboard 131, and a pointing device 130 (e.g., mouse, track ball, pen device, or the like). Additional input/output devices, such as the rendering device 140 may be included in association with the data-processing apparatus 110 as desired.

Figure 2:
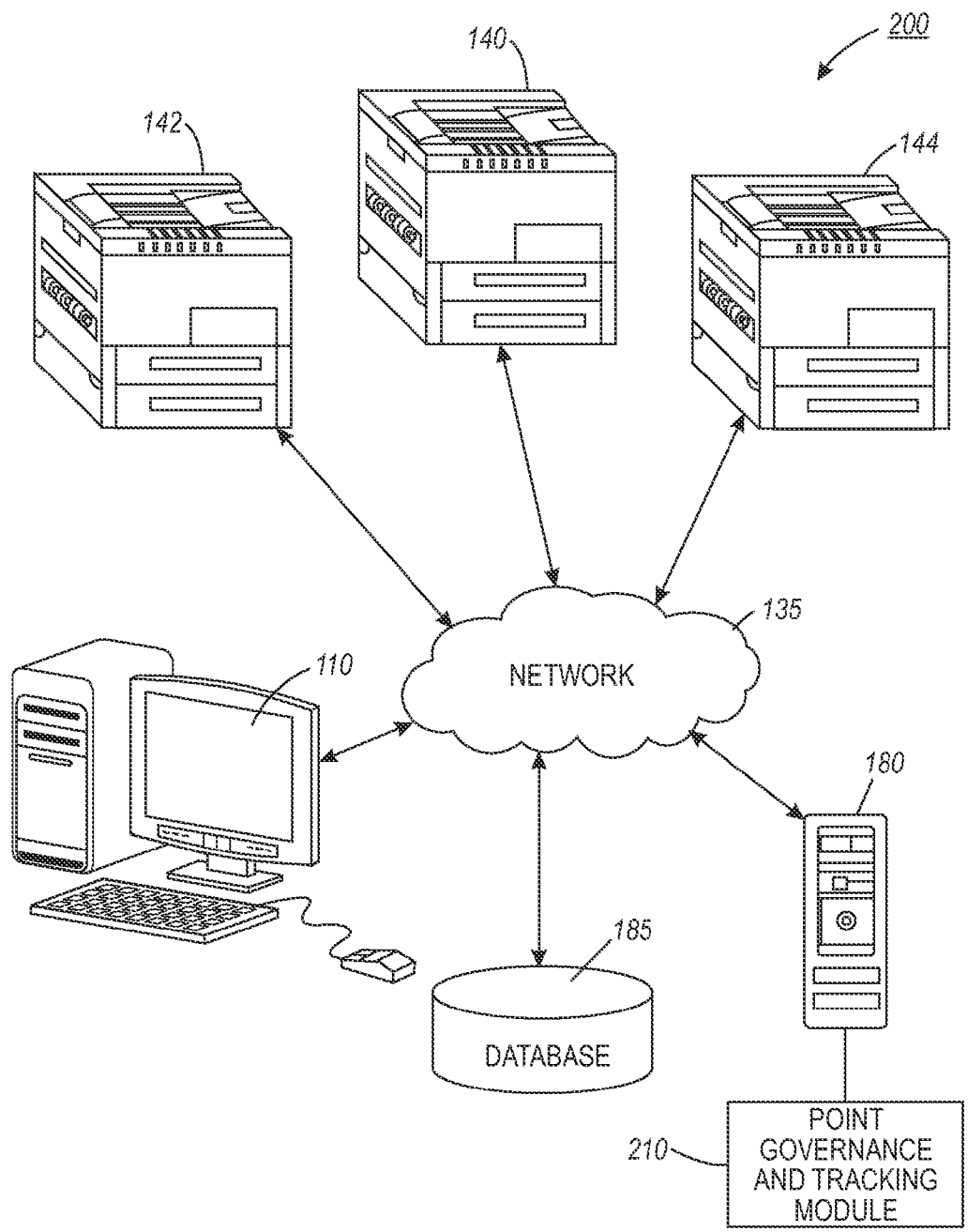
FIG. 2 illustrates a graphical representation of a rendering device management system associated with the network, in accordance with the disclosed embodiments.

Note that as utilized herein, the term rendering device may refer to an apparatus or system such as a printer, scanner, fax machine, copy machine, etc., and/or a combination thereof (e.g., an MFD). Preferably, rendering device 140 is an MFD capable of multiple rendering functions such as printing, copying, scanning, faxing, etc. In some embodiments, the rendering device 140 may be implemented with a single rendering function such as printing. In other embodiments, the rendering device 140 can be configured to provide multiple rendering functions, such as scanning, faxing, printing and copying. Note that the rendering devices 142 and 144 illustrated herein with respect to FIG. 2 are generally analogous or similar to rendering device 140.

A non-limiting example of an MFD that can be utilized as rendering devices 140, 142 and/or 144 is disclosed in U.S. Pat. No. 7,525,676, entitled "System and Method for Controlling Access to Programming Options of a Multifunction Device," which issued on Apr. 28, 2009 to Robert J. Pesar. U.S. Pat. No. 7,525,676, which is incorporated herein by reference in its entirety, is assigned to the Xerox Corporation of Norwalk, Conn. Another non-limiting example of an MFD that can be utilized as rendering devices 140, 142 and/or 144 is disclosed in U.S. Pat. No. 7,474,428, entitled "Multifunction Device System Using Tags Containing Output Information," which issued on Jan. 6, 2009 to Morris-Jones, et al. U.S. Pat. No. 7,474,428, which is incorporated herein by reference in its entirety, is also assigned to the Xerox Corporation of Norwalk, Conn. An additional example of an MFD that can be utilized as rendering devices 140, 142 and/or 144 is disclosed in U.S. Pat. No. 5,920,405, entitled "Multifunction Device With Printer Facsimile Contention Selection," which issued on Jul. 6, 1999 to McIntyre, et al. U.S. Pat. No. 5,920,405, which is incorporated herein by reference in its entirety, is also assigned to the Xerox Corporation of Norwalk, Conn.

The data-processing apparatus 110 can be coupled to the rendering device 140 (and other rendering devices) through a computer network 135. Network 135 may employ any network topology, transmission medium, or network protocol. The network 135 may include connections, such as wire, wireless communication links, or fiber optic cables. In the depicted example, network 135 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages.

The rendering device 140 includes a user interface 145, such as a panel menu. The panel menu may be used to select features and enter other data in the rendering device 140. Such interfaces may include, for example, touch screens having touch activated keys for navigating through an option menu or the like. A driver program, for example, can be installed on the data-processing apparatus 110 and can reside on the host device's hard drive 150. The driver program may be activated through an application interface so that a user may generate a print job with the driver for processing by the rendering device 140.

The data-processing apparatus 110 also includes a GUI 125 for communicating rendering features for processing, for example, a print job to a user and accepting the user's selection of available rendering features. The user interface 125 displays information and receives data through device display and/or the keyboard/mouse combination. The interface 125, also serves to display results, whereupon the user may supply additional inputs or terminate a given session. The data-processing apparatus 110 can be, for example, any computing device capable of being integrated within a network, such as a PDA, personal computer, cellular telephone, point-of-sale terminal, server, etc.

Note that the user interface as utilized herein generally refers to a type of environment that represents programs, files, options and so forth by means of graphically displayed icons, menus, and dialog boxes on a screen. The input device of the rendering device 140, for example, may be a local user interface 125, such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface by manipulating the touch screen, keypad, or communicating via wireless messages through the wireless port. The administrator's portable device that communicates wirelessly may be a personal digital assistant (PDA), or the like, as noted above.

The following description is presented with respect to embodiments of the present invention, which can be embodied in the context of a data-processing apparatus 110 and rendering device 140 depicted in FIG. 1. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like.

Therefore, the description of the exemplary embodiments, which follows, is for purposes of illustration and not considered a limitation.

FIG. 2 illustrates a graphical representation of a device management system 200 associated with a network 135, in accordance with the disclosed embodiments. The device management system 200 generally includes the network 135 associated with one or more rendering devices 140, 142 and 144, data-processing system 110, rendering server 180 and a database 185. Data-processing system 110 depicted in FIG. 2 can be, for example, a server. Other devices such as, for example, desktops, network devices, palmtops, mobile phones, etc may also be included in the network infrastructure 135, as service providers. The rendering devices 140, 142 and 144 can be located remotely with respect to each other, or alternatively, they may be located locally with respect to each other.

The rendering device 140 can be an office machine which incorporates the functionality of multiple devices in one, so as to provide centralized document management, document distribution and production in a large-office setting and the like. The typical rendering device 140 can act as a combination of a printer, scanner, photocopier, fax and e-mail. While three rendering devices 140, 142 and 144 are shown by way of example, it is to be appreciated that any number of rendering devices can be linked to the network 135, such as two, four, six or more rendering devices. In general, the rendering devices 140, 142 and 144 can be employed to perform a rendering output function (e.g., printing, scanning, copying, faxing, etc) within a networked environment. Each MFD 140, 142 and 144 in the network 135 may collect its own data and store a persistent history associated with the data locally on the database 185 accessible by the rendering devices 140, 142 and 144. Note that rendering devices 140, 142 and 144 are generally analogous to one another.

The device management system 200 further includes a print governance and tracking module 210 for tracking and measuring bypass of a print governance policy with respect to the rendering devices 140, 142 and 144 within the network 135. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media, such as floppy disks, hard disk drives, USB drives, Flash memory drives, CD ROMs, CD-Rs, etc., and transmission media, such as digital and/or analog communication links. Examples of transmission media can also include devices such as modems, which permit information to be transmitted over standard telephone lines and/or the more advanced digital communications lines.

Figure 3:
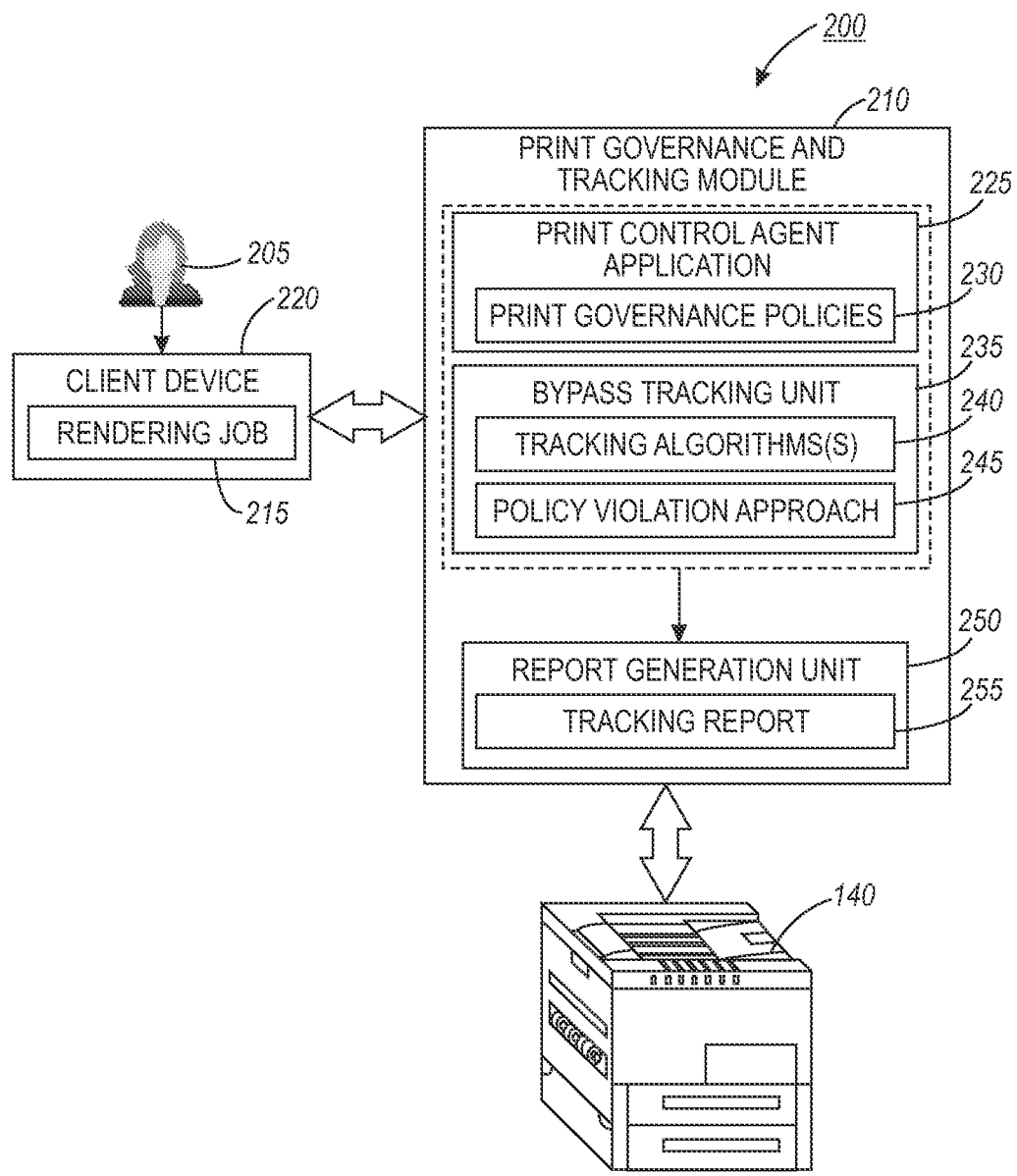
FIG. 3 illustrates a block diagram of the rendering device management system, in accordance with the disclosed embodiments.

FIG. 3 illustrates a block diagram of the device management system 200, in accordance with the disclosed embodiments. Note that in FIGS. 1-5, identical or similar blocks are generally indicated by identical reference numerals. The device management system 200 in association with the print governance and tracking module 210 can be employed for efficiently tracking bypass of the print governance policies 235 in a wide range of business applications such as, for example, corporate enterprises, educational, government and medical institutions, etc. The print governance and tracking module 210 generally includes a print control agent application 225, a policy bypass tracking unit 235 and a policy bypass report generation unit 250.

The print control agent application 225 can be configured with one or more print governance policies and/or rules 230 for managing behavior of a rendering job 215 submitted from a client device 220. Note that the client device 220 can be a data processing system 100 such as for example, a local machine a laptop, a PDA, and Smartphone etc. The print control agent application 225 typically intercepts the rendering job 215 in order to provide an improved print efficiency with respect to a user 205 within the business environment. Note that the print governance policies and/or rules 230 can be generally configured with respect to a print attribute of the rendering job 215 such as for example, user, color, duplex, total impressions, day and time and document type, etc. The print control agent application 225 can further pause, confirm and/or reject the rendering job 215 based on the print governance policies 230.

The policy bypass tracking unit 235 associated with the print governance and tracking module 210 tracks and measures a rendering job activity 215 that bypasses the print governance policies 230 based on a number of policy violation approaches 245 utilizing a set tracking algorithms 240. Note that the policy volition approach 245 described herein can be any operational mode that bypasses the print governance policies 230 intentionally/unintentionally within the network 135. The policy bypass reporting unit 250 further generates a bypass tracking report 255 based on the tracked data with respect to the rendering job 215. Note that the tracking report 255 can be displayed at the user interfaces 125 and 145 of the client device 220 and/or the rendering device 140. The tracking report 255 visually represents the tracked data in order to analyze the print governance violation and its frequency of occurrence thereby improving compliance with the rendering policies and/or rules 230.

Figure 4:
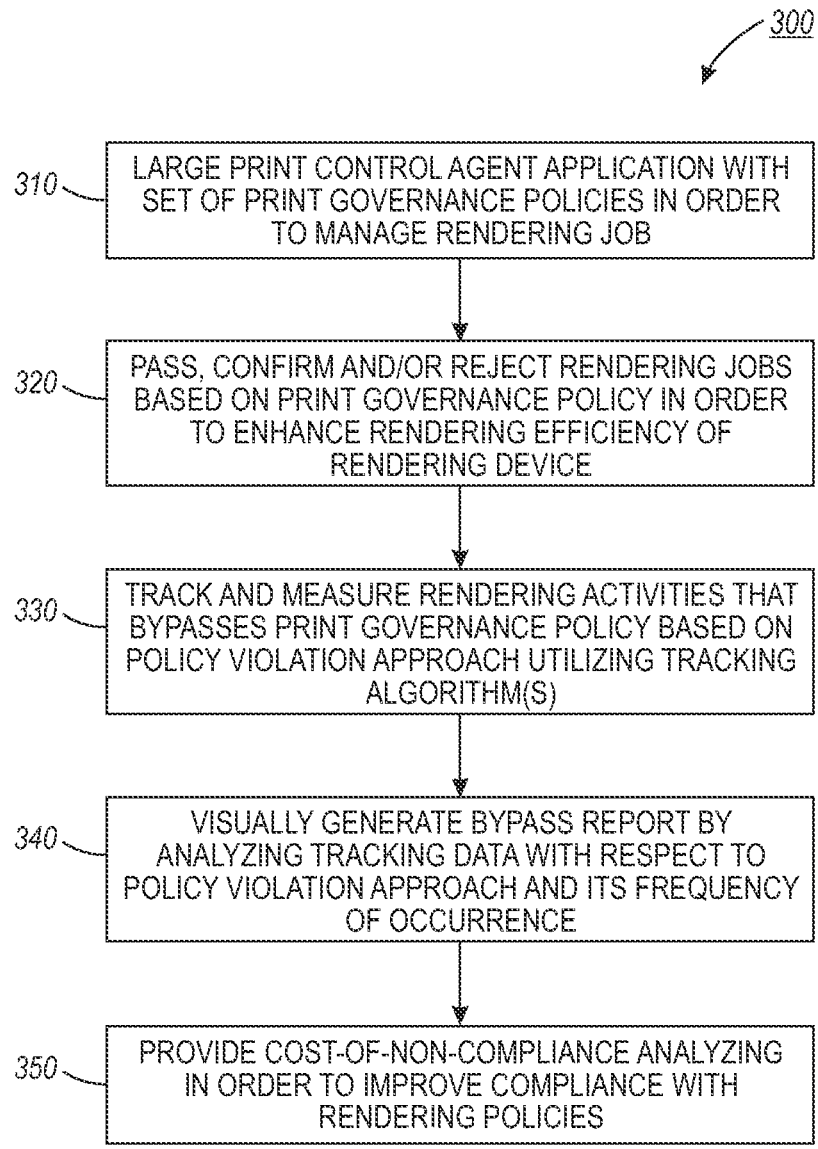
FIG. 4 illustrates a high level flow chart of operation illustrating logical operational steps of a method for tracking bypass of a print governance policy, in accordance with the disclosed embodiments.

FIG. 4 illustrates a high level flow chart of operation illustrating logical operational steps of a method 300 for tracking bypass of the print governance policy 230 within the network 135, in accordance with the disclosed embodiments. Note that the method 300 can be implemented in the context of a computer-useable medium that contains a program product, including, for example, a module or group of modules. The print control agent application 225 can be loaded with the pre-defined print governance policies and rules 230 in order to manage the behavior of the rendering job 215 in the network 135, as illustrated at block 310. The rendering job 215 can be paused, confirmed and/or rejected based on the print governance policy 230 in order to enhance efficiency of the rendering device 140, as indicted at block 320.

The rendering job activity 215 that bypasses the print governance policies 230 based on the policy violation approaches 245 can be thereafter tracked and measured utilizing the set of tracking algorithms 240, as depicted at block 330. The rendering job activity 215 that bypasses the print governance policies 230 utilizing a non-standard rendering protocol can be tracked by calculating an average bypass rate (Jd). The average bypass rate (Jd) can be calculated based on a difference (Id) between a total impression rendered during a predefined period (Im) and a job accounting data record (Ij) reported by the print control agent application 225, as shown below in equations (1) and (2).

$$Id = Im - Ij \quad (1)$$

$$Jd = Id/X \quad (2)$$

Where, X represents average impressions per rendering job. The total impression rendered during a given period can be calculated by a device meter. For example, if the print control agent application 225 is not running or not installed then the job accounting data is missed. Therefore, a difference between the total impressions rendered during the predefined period (Im) and the job accounting data (Ij), where Im>Ij, represents a clear indication that some jobs are rendered by bypassing or in absence of the print control agent application 225. The value of Id is proportional to the rate of jobs rendered bypassing the print governance policies 230 in the network 135.

The rendering jobs 215 rendered with the print control agent 225 in a shutdown mode can be tracked by retrieving and reporting a missing rendering job record (Jm) from a system event log and/or a performance counter to the device management system 200. For example, the print controls agent application 225 can shutdown temporarily if the software is crashed, the software disabled by the user or the software stop functioning due to some reason. The jobs 215 rendered during this time directly from the same client device 220 can obviously skip the business print policies 230. Hence the system event log can be enabled to retrieve the rendering job activity 215 logged in a repository and the performance counter can be enabled to track number of jobs printed through the client device 220. The value of Jm is proportional to the rate of jobs rendered bypassing the print governance policies 230 in the network 135.

Similarly, the rendering job activity 215 that bypasses the print governance policies 230 by splitting a large rendering job into multiple rendering jobs can be tracked by analyzing a document title and a user name. The print accounting records that are similar can be linked to determine violation of the rendering policy (Js). For example, a user can utilize print rules like MAX impressions that can be rendered at the rendering device 140 by breaking a large job into several smaller print requests. Also, multiple copies printing application, renders each copy set as a separate job rather than rendering one job with multiple copy sets. The print governance and tracking module 210 can determine if the same document is rendered partially or completely again by checking the document title and user name. The related print accounting records can be linked and checked whether the combined-together impressions for a given document violates any of the configured rules based on impressions. The value of Js is proportional to the rate of jobs rendered bypassing the print governance policies 230 in the network 135.

The rendering job activity 215 that bypasses the print governance policies 230 by providing an incorrect day and time (Jdt) can be tracked by comparing a time (Ts) captured by a local machine and a time (Ta) captured from a remote reliable source. For example, time (Ts) captured in the job accounting data record depends on a local time of the client device 220 therefore users can violate the print policies and rules 230 that prevent rendering during non-business hours if the local time is set incorrectly. The print governance and tracking module 210 can be enhanced to capture day and time information from the remote reliable source. A duplicate but more reliable time value can be captured (Ta) along with other job fields when the rendering job 215 is processed and reported by the agent to the system 200. The time (Ts) captured by the local machine and the time (Ta) captured from the remote reliable source can be compared to determine violation. The value of Jdt is proportional to the rate of jobs rendered bypassing the print governance policies 230 in the network 135.

The rendering job activity 215 that bypasses the print governance policies 230 by converting a document type to a different format (Jt) can be tracked by interrogating a print stream in order to determine an original file type of the rendering job 215. For example, email messages and/or web pages can be saved as PDF files, and then rendered from Acrobat to avoid governance rules. The print stream can be interrogated to determine the origin of the content originated. The bypass tracking report 255 can be visually generated by analyzing the tracked data with respect to the print governance bypass modes 245 and their frequency of occurrence, as illustrated at block 340. A cost-of-non-compliance analysis can be provided in order to improve compliance with rendering policies in a wide range of business applications, as depicted at block 350.

Note that programs defining functions with respect to the disclosed embodiments may be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including, for example, Ethernet, the Internet, wireless networks, other networked systems. Thus, the method 400 described herein can be deployed as process software in the context of a computer system or data-processing system as that depicted in FIGS. 1-2.

Figure 5:
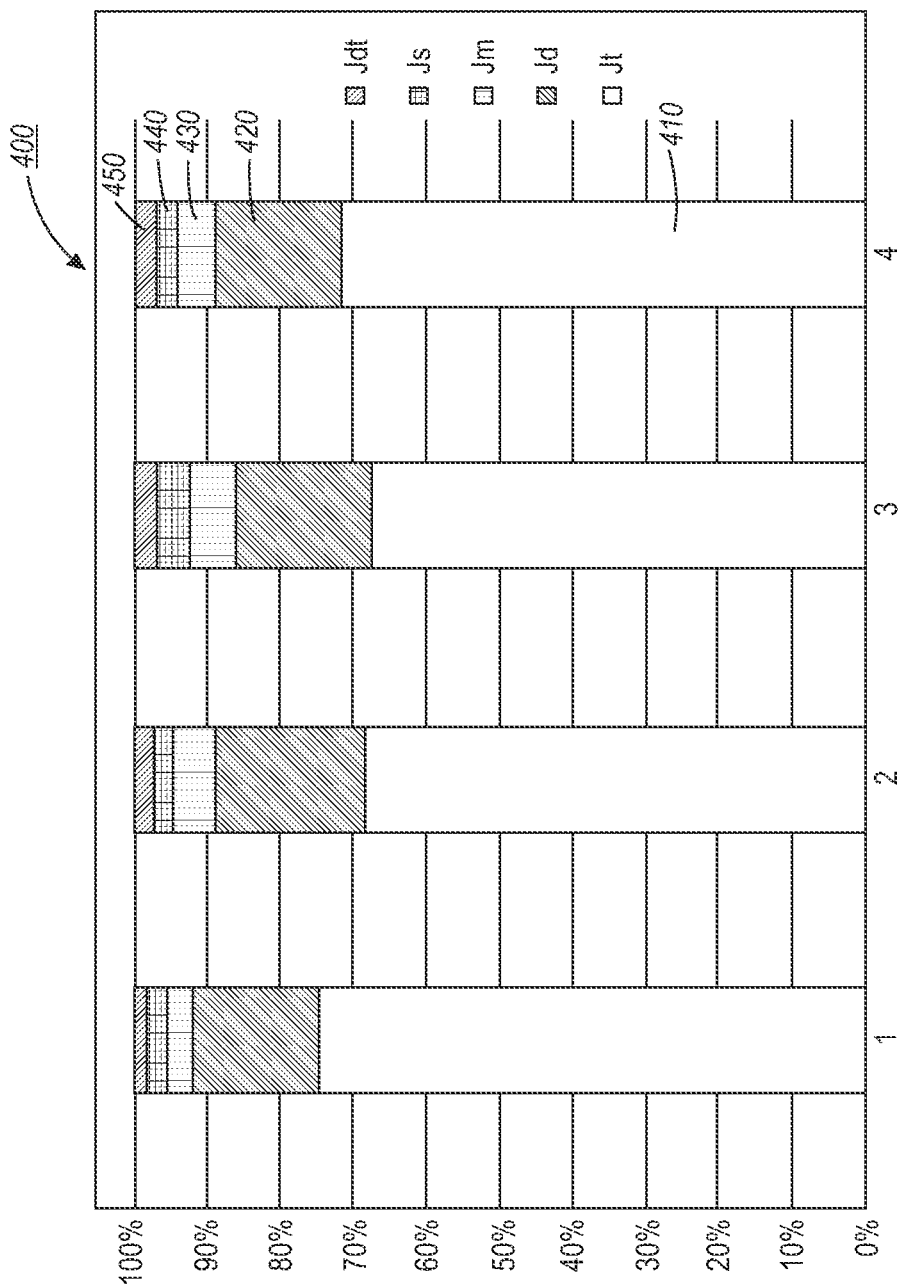
FIG. 5 illustrates a graphical representation of a print governance bypass report, in accordance with the disclosed embodiments.

FIG. 5 illustrates a graphical representation 400 of the print governance bypass report 255, in accordance with the disclosed embodiments. The bypass report 255 with respect to the policy violation approaches 245 can be employed to estimate cost saving rendering solutions. The bypass report 255 can be analyzed to improve the compliance of the governance policies 230 in the rendering device 140. The region 410 represents the total rendering activity (Jt) that are validated under the print governance polices 230. The region 420 represents the rendering activities (Jd) that bypass the print governance policies 230 utilizing the non-standard rendering protocol. The region 430 represents the rendering activities (Jm) that bypass the print governance policies 230 with the print control agent shutdown. The region 440 represents the rendering activities that bypass the print governance policies 230 by splitting the large rendering job into multiple rendering jobs in order to determine violation of the rendering policy (Js). The region 450 represents the rendering activities (Jdt) that bypass the print governance policies 230 by providing the incorrect day and time. Such an approach therefore provides an effective tool for improving overall effectiveness and compliance with respect to the print governance policies.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method, comprising:
   tracking and measuring a rendering job activity that bypasses at least one print governance policy with respect to a rendering device based on a plurality of policy violation approaches utilizing a tracking algorithm in order to generate tracked data; and
   visually generating a bypass report with respect to said rendering job activity based on said tracked data in order to analyze said plurality of policy violation approaches and a frequency of occurrence thereby providing an effective tool for improving an overall effectiveness and compliance with respect to said at least one predefined rendering policy.

2. The method of claim 1 further comprising passing said rendering job based on said at least one print governance policy.

3. The method of claim 1 further comprising rejecting said rendering job based on said at least one print governance policy.

4. The method of claim 1 further comprising calculating an average bypass rate based on a difference between a total impression rendered during a predefined time period and a job accounting data record reported by a print control agent application in order to track said rendering job activity that bypasses said at least one print governance policy utilizing a non-standard rendering protocol.

5. The method of claim 4 further comprising calculating said total impression rendered during said predefined time period by a device meter.

6. The method of claim 1 further comprising retrieving and reporting a missing rendering job record from a system event log and a performance counter in order to track said rendering job rendered without running said print control agent application.

7. The method of claim 1 further comprising analyzing and linking said rendering job with similar document title and a user name in order to track said rendering job activity that bypasses said at least one print governance policy by splitting a large rendering job into multiple rendering jobs.

8. The method of claim 1 further comprising comparing a time and day information captured by a local machine and a remote reliable source in order to track said rendering job activity that bypasses said at least one print governance policy by providing an incorrect time and day information.

9. The method of claim 1 further comprising interrogating a print stream to determine an original file type of said rendering job in order to track said rendering job activity that bypasses said at least one print governance policy by converting a document type associated with said rendering job to a different format.

10. A system, comprising:
    a processor;
    a data bus coupled to said processor; and
    a computer-usable medium embodying computer code, said computer-usable medium being coupled to said data bus, said computer program code comprising instructions executable by said processor and configured for:
    tracking and measuring a rendering job activity that bypasses at least one print governance policy with respect to a rendering device based on a plurality of policy violation approaches utilizing a tracking algorithm in order to generate tracked data; and
    visually generating a bypass report with respect to said rendering job activity based on said tracked data in order to analyze said plurality of policy violation approaches and a frequency of occurrence thereby providing an effective tool for improving an overall effectiveness and compliance with respect to said at least one predefined rendering policy.

11. The system of claim 10 wherein said instructions are further configured for passing said rendering job based on said at least one print governance policy.

12. The system of claim 10 wherein said instructions are further configured for rejecting said rendering job based on said at least one print governance policy.

13. The system of claim 10 wherein said instructions are further configured for calculating an average bypass rate based on a difference between a total impression rendered during a predefined time period and a job accounting data record reported by a print control agent application in order to track said rendering job activity that bypasses said at least one print governance policy utilizing a non-standard rendering protocol.

14. The system of claim 13 wherein said instructions are further configured for calculating said total impression rendered during said predefined time period by a device meter.

15. The system of claim 10 wherein said instructions are further configured for retrieving and reporting a missing rendering job record from a system event log and a performance counter in order to track said rendering job rendered without running said print control agent application.

16. The system of claim 10 wherein said instructions are further configured for analyzing and linking said rendering job with similar document title and a user name in order to track said rendering job activity that bypasses said at least one print governance policy by splitting a large rendering job into multiple rendering jobs.

17. The system of claim 10 wherein said instructions are further configured for comparing a time and day information captured by a local machine and a remote reliable source in order to track said rendering job activity that bypasses said at least one print governance policy by providing an incorrect time and day information.

18. The system of claim 10 wherein said instructions are further configured for interrogating a print stream to determine an original file type of said rendering job in order to track said rendering job activity that bypasses said at least one print governance policy by converting a document type associated with said rendering job to a different format.

19. A system, comprising:
    a processor;
    a data bus coupled to said processor; and
    a computer-usable medium embodying computer code, said computer-usable medium being coupled to said data bus, said computer program code comprising instructions executable by said processor and configured for:
    tracking and measuring a rendering job activity that bypasses at least one print governance policy with respect to a rendering device based on a plurality of policy violation approaches utilizing a tracking algorithm in order to generate tracked data;
    visually generating a bypass report with respect to said rendering job activity based on said tracked data in order to analyze said plurality of policy violation approaches and a frequency of occurrence thereby providing an effective tool for improving an overall effectiveness and compliance with respect to said at least one predefined rendering policy; and calculating an average bypass rate based on a difference between a total impression rendered during a predefined time period and a job accounting data record reported by a print control agent application in order to track said rendering job activity that bypasses said at least one print governance policy utilizing a non-standard rendering protocol.

20. The system of claim 19 wherein said instructions are further configured for:

passing said rendering job based on said at least one print governance policy; and rejecting said rendering job based on said at least one print governance policy.

\* \* \* \* \*